UNITED STATES PATENT OFFICE.

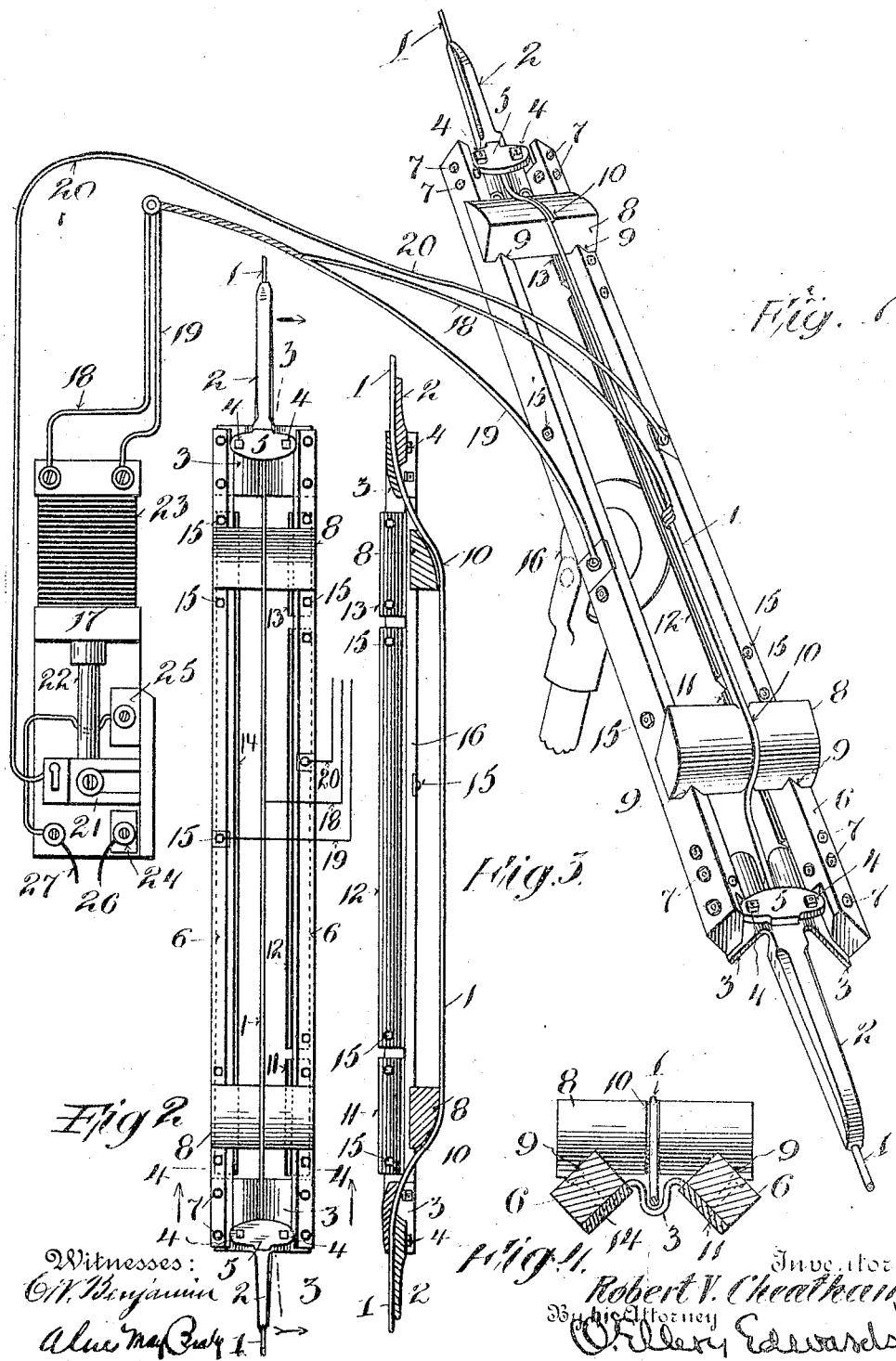

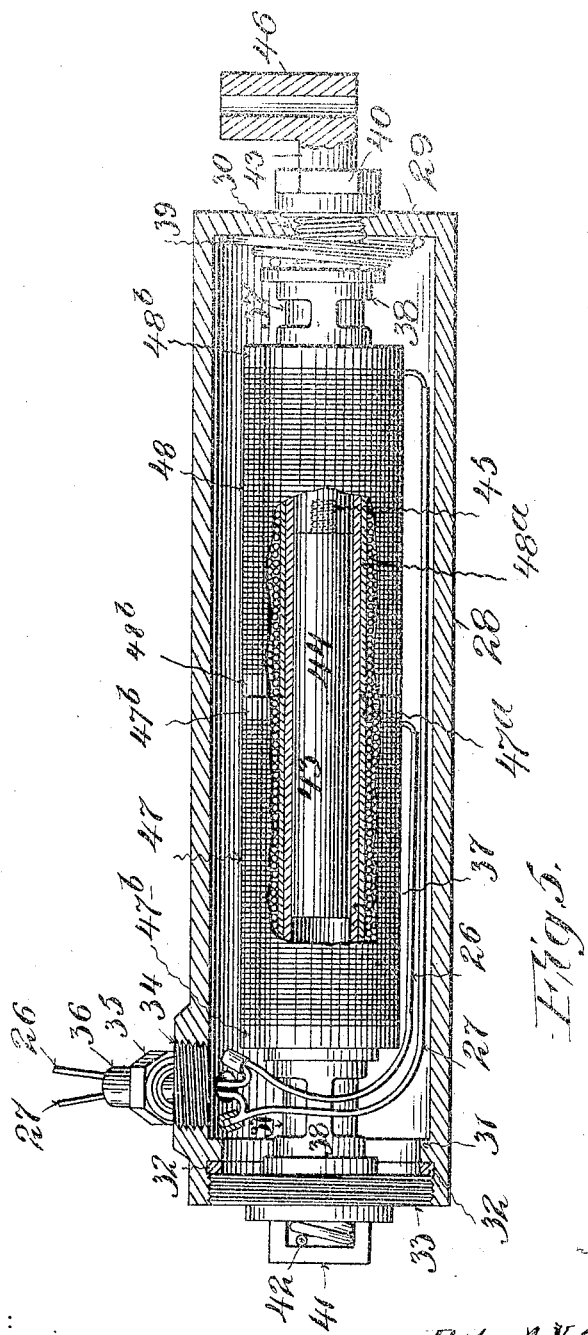

ROBERT V. CHEATHAM, OF LOUISVILLE, KENTUCKY, ASSIGNOR TO CHEATHAM ELECTRIC SWITCHING DEVICE COMPANY, OF LOUISVILLE, KENTUCKY.

ELECTRIC SWITCHING DEVICE FOR RAILWAYS.

No. 917,541.　　Specification of Letters Patent.　　Patented April 6, 1909.

Application filed June 25, 1907. Serial No. 380,669.

*To all whom it may concern:*

Be it known that I, ROBERT V. CHEATHAM, a citizen of the United States, and a resident of Louisville, county of Jefferson, and State of Kentucky, have invented a new and useful Improvement in Electric Switching Devices for Railways, of which the following is a specification.

The object of my invention is to improve the details of construction of the switching device shown in my prior patents, (612,702, 696,313, and 787,827) as will more particularly hereinafter appear.

For a more particular description of my invention reference is had to the accompanying drawings forming a part hereof, in which—

Figure 1 is a perspective view of the trolley pan and circuit changer. Fig. 2 is a plan view of the trolley pan. Figs. 3 and 4 are sectional views taken on the lines 3.3 and 4.4 respectively of Fig. 2 looking in the direction of the arrows. Fig. 5 is a longitudinal elevation, partially in section, of the solenoid and its incasing cylinder, the solenoid being used to throw the switch point.

Throughout the various views of the drawings similar reference characters designate similar parts.

The trolley wire 1 is provided at a suitable place with suitable clamps 2 to which the trolley wire is soldered or held in the usual way therein. The inner ends of these clamps 2 are provided with outwardly and downwardly extending plates 3, which plates are preferably formed of one integral piece that extends under the trolley. These plates 3 may be held in place by any suitable means, as by bolts 4 extending from a head 5 formed on the clamp 2. The wings 3 are connected by parallel strips 6, which are rectangular in cross section and so disposed that their lower surfaces rest flat on the diagonally disposed plates 3. The strips 6 are held in place by means of bolts 7, or other suitable means. The deflecting blocks 8 rest on the strips 6 and have mortises 9 so as to fit snug on the strips, as shown, and these deflecting blocks 8 are also grooved at 10 to carry the trolley wire and raise it above its normal level and clear of the lower surfaces of strip 6.

Insulated from plates 3 and secured to the lower surfaces of the strip 6 are the flat metal bars 11, 12 and 13 on one strip 6, and the bar 14 on the other. These bars are held by suitable bolts 15, or other suitable means. The bars 13 and 11 have no electrical connections and are carefully insulated. The bars 12 and 14 are connected with wires to the controlling mechanism, as will appear below.

The parts of the trolley pan, just above described, are so arranged that when a trolley wheel 16 runs from the wire 1 to the trolley pan it will first bridge the gap between strips 11 and 14, then between the strips 12 and 14, and finally between the strips 13 and 14, and be off the trolley wire, which is raised at these points, but the course of the trolley is practically a straight line so that it is not moved any more than it would be if there were no trolley pan. While the trolley is under the trolley pan and in engagement therewith, it has no connection with the wire 1.

The controller 17 is the same as shown and described in my former patents, and is therefore not shown or described here except in a diagrammatic way. It is connected with the trolley wire 1 by a conductor 18 and the strip 14 by a conductor 19, so that the strip 14 is always charged with electricity through the magnet of the controller 17. The bar 12 is connected with a conductor 20 which passes to the plate 21, which is attached and insulated from the core 22 of the magnet 23 of this controller 17. The plate 21 may be in contact with the lower plate 24 on which it normally rests, or the upper plate 25. The plate 24 is connected with a wire 26 which runs to the winding at the left of the solenoid shown in Fig. 5 and the upper plate 25 is connected by a wire 27 with the winding of the solenoid at the right of the structure shown in Fig. 5.

The casing 28 is preferably tubular in form and provided with an integral head 29, through which is a straight bore 30. The other end of this casing is provided with an inwardly projecting collar 31, on which rests a gasket 32 against which is secured a screw plug 33, which fits corresponding threads in the casing or casting 28. Near the collar 31 is a screw threaded opening in the walls of the casing 28 in which is placed a screw plug 34. Near the screw plug 34 is a second opening which is connected with the union 35, which is in turn connected with the pipe 36, through which the conductors 26 and 27 pass, and this pipe runs to the controller 17, so that at no point are the conductors 26 and 27 in any way exposed to climatic conditions. Mounted in the casing 28 is a brass tube 37 which passes through the center of this casing, and the two magnets, one for each solenoid, are supported thereon in a central position by collars 38, one collar 38 abuts against the head or plug 33, and the other against a spring 39 which is coiled so as to rest against the integral head 29, and this tube 37 is screw threaded where it passes through the head 29 and is held in place by a nut 40 on its outer extremity, and at its other end, the tube 37 is screwed into the head 33. The tube 37 is open at both ends. The head 33 is also provided with a perforated ear 41 in which rests a coiled spring 42, which also rests in the tube 37, so that air or water can pass freely into the open end of this tube and the spring 42 acts as a cushion for the core 43, should such action be necessary. The core 43 fits loosely in the tube 37 and is preferably formed of two parts, one 44 of iron and the other 45 of brass, the part 44 being in the end next the cushioned spring 42. The outer end 46 of the core 43 is bent upwardly to engage the switch throwing mechanism precisely as described in my former patents above referred to.

The solenoids 47 and 48 are wound on their respective tubes 47ª and 48ª having fiber heads 47ᵇ and 48ᵇ screwed thereon. The solenoids 47 and 48 are grounded at one end of their windings and the other ends are connected with the wires 26 and 27 respectively. The tubes 47ª and 48ª are placed on the tube 37 between the collars 38. Except for the grounding of the wires at their inner ends the solenoids 47 and 48 are carefully insulated both from the casing 28 and from each other. The wires 26 and 27 are passed through the pipe 36 and union 35 into the casing 28 and are there united to the wires 26 and 27 in the casing by workmen who can draw them out through the opening normally closed by the screw plug 33. This enables the electrical connections to be easily made and to thoroughly protect them after having been made.

The operation of my improved switching device is the same as described in my preceding patents. A large current that exceeds the combined current capacity of the heaters, lights and pump is required to energize the controller 17 sufficiently to raise the armature 22 and thereby shift the contact plate 21 from the lower contact plate 24 to the upper contact plate 25, so that if only a small current of electricity is passed through the trolley mechanism when the trolley wheel 16 is in the position shown a circuit is maintained through the conductor 18, magnet 23, wire 19, strip 14, wheel 16, strip 12, conductor 20, plate 21 and 24, conductor 26 and solenoid 47, thereby causing the switch to be set so that a car will move straight ahead. If a heavy current is drawn through the trolley pole, as is the case when the motors are active, the circuit is the same as above except that the armature 22 is drawn up and then the circuit is completed through the plates 21 and 25, conductor 27, to the solenoid 48. This draws the core 43 in the other direction, thereby causing the switch point to be open and making the car take the curve, so that at all times the question as to whether or not the car will not take the curve is determined by the motorman who leaves his motor current on or off in accordance with the direction in which he wishes to go.

In the foregoing has been set forth one embodiment of my invention. It is obvious that it is not restricted to the precise details of construction therein set forth but is broad enough to cover all structures that come within the scope of the annexed claims.

What is claimed is:

1. In a device of the class described a trolley pan having parallel flat strips with flat bottoms inclined at an angle to the horizontal and conducting bars secured to said inclined lower surfaces.

2. In a device of the class described a trolley pan having parallel flat strips with inclined lower surfaces, conducting bars, insulated from each other and secured to said lower surfaces, and means for throwing a switch point connected with some of said conducting bars.

3. In a trolley pan or similar device clamps, parallel strips uniting said clamps, said strips having inclined lower surfaces, flat bars resting on said surfaces, and deflecting blocks above said bars.

4. In a trolley pan or similar device clamps, strips, rectangular in cross section, with inclined lower surfaces, uniting said clamps, and flat conducting bars secured to the lower surface of said strips.

5. In a trolley pan or similar device clamps, parallel strips, rectangular in cross section, uniting said clamps, flat conducting bars secured to the lower surfaces of said strips, and mortised deflecting blocks placed on the upper surfaces of said strips.

6. In a device of the class described, solenoids mounted in a casing, each independent of the other, a tube extending through the solenoids, a casing and a cushioned spring secured in alinement with the bore of said tube and adapted to be impinged by a core in said tube means for controlling the operation of said solenoid connected with a trolley wire.

7. In a device of the class described a casing, a union secured to said casing, a screw threaded opening adjacent to said union, a plug in said opening, and a solenoid in said casing, and having wires leading
5 therefrom and adapted to be secured to other wires brought through said union through the opening normally closed by said plug and electrical means connected to said solenoid, whereby it may be operated by a trolley.

ROBERT V. CHEATHAM.

Witnesses:
 ROBT. R. REIS,
 T. M. GETTYS.